2,776,424
AUTOMATIC LOCK-ON CIRCUIT

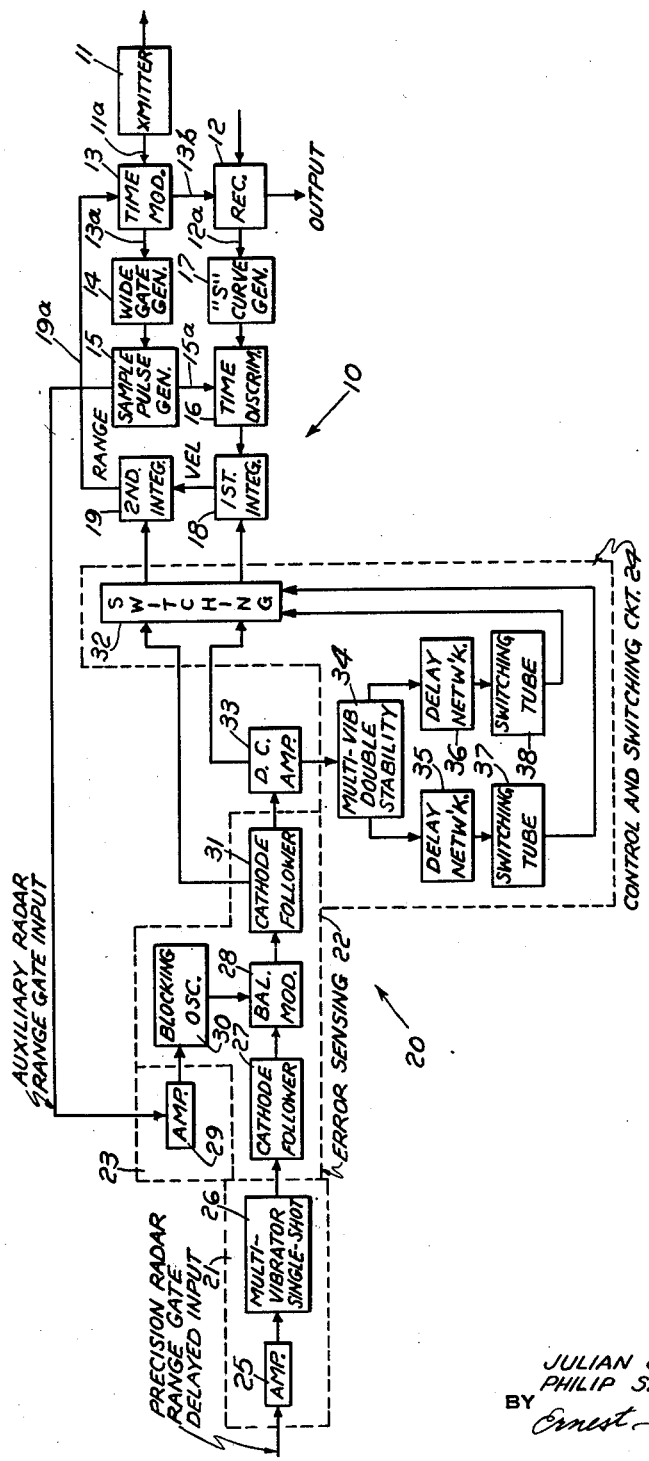

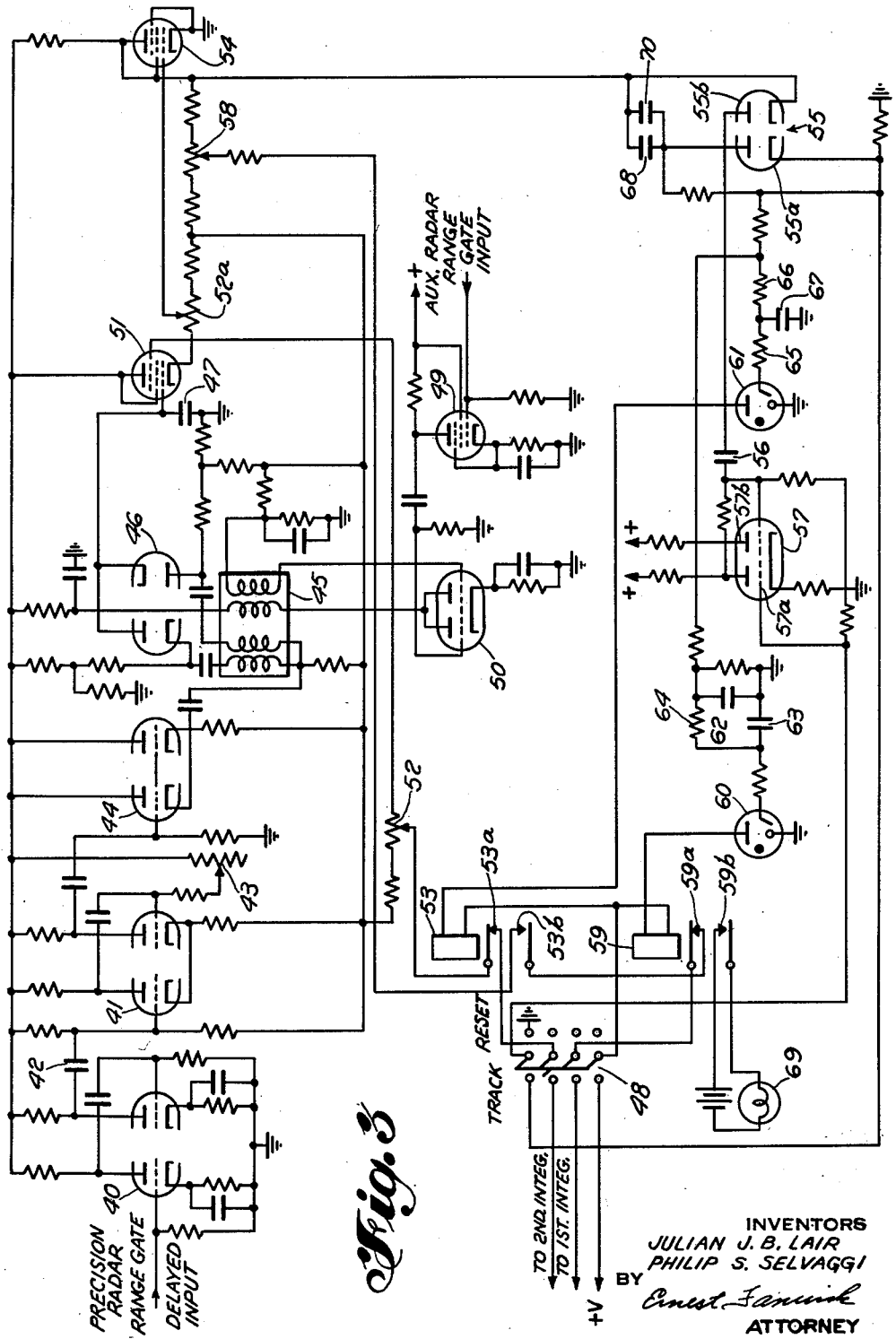

Julien J. B. Lair, Glen Ridge, and Philip S. Selvaggi, Passaic, N. J., assignors to International Telephone and Telegraph Corporation, Nutley, N. J., a corporation of Maryland Application November 4, 1954, Serial No. 466,860

7 Claims. (Cl. 343—7.3)

This invention relates to radar systems capable of tracking selected targets and more particularly to an automatic lock-on circuit for causing a second or auxiliary radar system to track a target selected by a first or precision radar system.

In the past, radar systems have been developed which are capable of tracking a given target even in the presence of a great deal of noise. Generally such master or precision radars have been extremely expensive. There has also been developed a radar system capable of tracking a target but of a cheaper design and thus more expendable. However the cheaper or auxiliary radar systems lack precision or the ability to track through noise, and thus the extreme tracking range for such radar systems has been limited when compared to the range detectable by the precision radar systems. It is known that although such auxiliary radars may have trouble acquiring a target, the target once acquired can be tracked by the auxiliary radar.

Previously the precision radar system illuminated many targets at various ranges and the system operator selected one of the targets for tracking by the auxiliary system. The range gate of the precision radar was then positioned and adjusted for range and range rate or velocity by manually coupling a positive or a negative voltage, via a switch, into the range gate circuitry and then disengaging the switch when lock-on was achieved. After this the precision radar system operator synchronized the auxiliary radar tracking system to track the same target. When a plurality of auxiliary radar systems were associated with a single precision radar system the operator was required to work very quickly if he was to lock each auxiliary equipment onto a target in the very short period of available time between the appearance of the target at the maximum range of the radar system and its approach to the minimum range. It is, therefore, extremely desirable to reduce the precision radar operator's burden and at the same time reduce the time necessary for lock-on by providing an automatic lock-on circuit which operates to automatically synchronize the tracking system of the auxiliary system while the operator is selecting a target with the precision radar.

One of the objects of this invention therefore is to provide an automatic lock-on circuit which enables a second radar system to lock-on to and track a target selected by a first radar system.

Another object of this invention is to provide an automatic lock-on circuit which causes the range gate of a second radar system to track the tracking pulse of an operator controlled precision radar system.

A further object of this invention is to provide an automatic lock-on circuit having an input which includes the tracking pulse of a precision radar and the range gate pulse of an auxiliary radar system and causes the range gate pulse to lock-on to the tracking pulse and thus in effect to lock-on to a target selected by the precision radar operator.

One of the features of the automatic lock-on circuit of this invention is the comparison of the position of the precision radar's range gate with the time position or phase of the auxiliary radar range gate and the generation of a correction voltage responsive to any difference in their relative positions. The correction voltage is coupled to the range memory circuit (second integrator) of the auxiliary radar system in order to quickly move the range gate thereof into coincidence with the range gate of the precision radar. After acquisition by the auxiliary radar of the correct range the voltage is decoupled from the range memory circuit and a correction voltage is coupled to the range rate memory circuit (first integrator-velocity memory) of the auxiliary radar system. After a time delay necessary to establish the correct velocity memory in the range gate of the auxiliary radar the correction voltage is removed thus disengaging the automatic lock-on circuit from the auxiliary radar system.

The above-mentioned and other features and objects of this invention will become more apparent by reference to the following description taken in conjunction with the accompanying drawings, in which:

Fig. 2 is a schematic diagram in block form of the automatic lock-on circuit of this invention and a cooperating auxiliary tracking radar system;

Fig. 3 is a schematic circuit diagram of one embodiment of the automatic lock-on circuit of this invention; and, Fig. 4 is a series of curves helpful in the explanation of the automatic lock-on circuit shown in Figs. 2 and 3.

Figure 1:
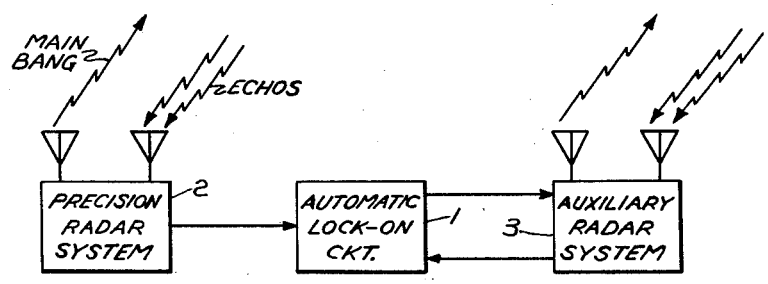
Fig. 1 is a schematic illustration in block form of a precision and auxiliary radar system cooperating with the automatic lock-on circuit of this invention.

Referring to Fig. 1, the automatic lock-on circuit 1 of this invention is shown cooperating with a precision radar system 2 and an auxiliary radar system 3. For purposes of explanation, it is assumed that although both the precision radar system 2 and the auxiliary radar system 3 are well-known tracking radar units the precision radar system 2 has an ability to detect targets at a greater range than the auxiliary radar 3 and track them more precisely through poorer signal-to-noise ratios. In accordance with well-known radar operation the precision radar system 2 transmits a plurality of pulses or "main bangs" which are reflected from targets and returned to the radar system 2 as echoes. Within the radar system 2 a range gate pulse is determined which disables the radar's receiver for the total period of time except when an echo is expected to be received. The range gate from the radar system 2 is coupled to the automatic lock-on circuit 1. The auxiliary radar system 3 also has a range gate which is coupled to the automatic lock-on circuit 1 and therein compared in time with the range gate coupled from the radar system 2, and the error voltage or comparison information is coupled from the automatic lock-on circuit 1 to the auxiliary radar system 3 to cause the auxiliary radar range gate to become time coincidence with the precision radar's range gate, or in other words, to cause the auxiliary radar range gate to track the precision radar system's range gate. After coincidence of the range gates of both radar systems 2 and 3 and the establishment of the same target velocity in system 3 as in system 2 the automatic lock-on circuit 1 is disengaged from the auxiliary radar system 3 which then operates in its normal manner.

Referring to Fig. 2 of the drawing, a more detailed schematic diagram in block form of the auxiliary radar system and the automatic lock-on circuit of this invention is shown wherein the auxiliary radar system is generally indicated at 10 and in general is well known to those skilled in the art and the automatic lock-on circuit is indicated at 20. For purposes of explanation, a typical tracking radar system is herein shown in block form although many other forms of tracking radar systems are known and can be substituted for the system illustrated. It is to be noted that a transmitter 11 transmits pulses which are detected by a receiver 12. At the commencement of a transmission a trigger signal is coupled from the transmitter 11 over line 11a to a delay multivibrator or time modulator 13 whose output coupled over line 13a triggers a wide gate generator 14. The output of the wide gate generator 14 is coupled to a sample pulse generator which generates a pulse 15 coupled to the time discriminator 16 via lead 15a. The output of receiver 12 is coupled over line 12a through an S-curve generator 17 to the time discriminator circuit 16 where its position relative to the output of the sample pulse generator 15 is determined. The voltage output of the discriminator 16 is then integrated in circuit 18 to obtain a voltage proportional to velocity or rate of change of range information. The rate of change of range information is integrated in circuit 19 to obtain the range or distance information which is fed back over line 19a to the time modulator 13. Another output of the time modulator 13 is coupled via line 13b to receiver 12 to cause the receiver 12 to be operative only during the period when an echo is expected to be received. Any variation in time between the sample pulse output from generator 15 and the echo detected by receiver 12 is transformed into an error voltage and coupled back to the time modulator to vary the delay and gate the receiver accordingly. The portion heretofore described may be termed an auxiliary radar system.

In accordance with the principles of this invention, such a radar system cooperates with a precision radar system of similar design but of better quality through an automatic lock-on circuit generally indicated at 20. The range gate information coupled from the precision radar system is coupled over an input circuit indicated at 21 to an error sensing circuit 22, having as another input the information from the auxiliary radar system's range gate. The error signal from circuit 22 is amplified and coupled to control and switching circuits 24 which operate as hereinafter explained.

Figure 4:
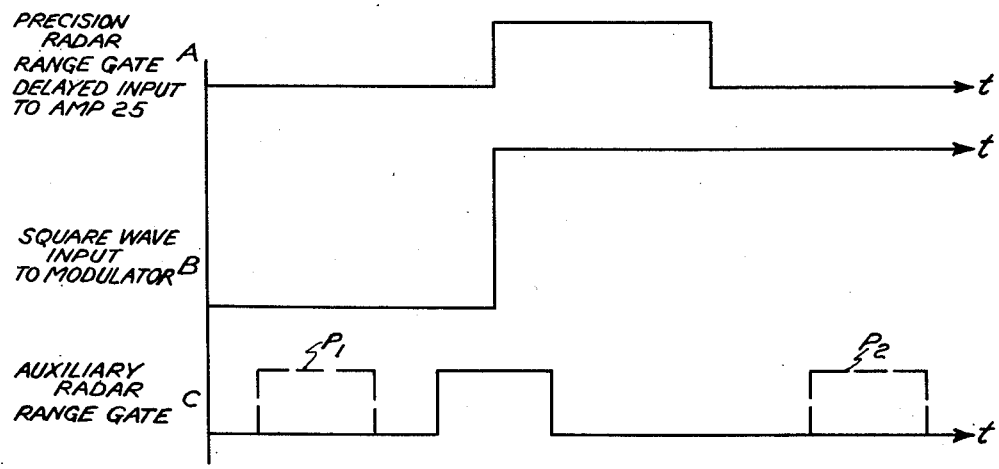

A signal indicative of the precision radar's range gate as shown in Fig. 4, curve A, is coupled to an amplifier 25 whose output controls a single shot multivibrator or square wave generator 26, adjusted to have approximately a 50% duty cycle. The square wave output of multivibrator 26 shown in Fig. 4, curve B is indicative of the time position of the precision radar's range gate and the square wave which is thus generated is applied to a balanced modulator 28 through a cathode follower circuit 27. The balanced modulator 28 does not produce any output until it also receives the range gate time position information as shown in Fig. 4, curve C from the auxiliary radar system which is amplified in circuit 29 and coupled to the blocking oscillator 30 whose output is thus indicative of the timing of the auxiliary radar's range gate. Balanced modulator 28 produces a voltage whose polarity is dependent upon the timing or relative phasing of the range gates of the auxiliary and precision radar systems. The polarized output from the balanced modulator 28 is fed to an isolating cathode follower circuit 31, one of whose outputs is coupled to the second integrator circuit 19 of the auxiliary radar system through a switching circuit 32. Another output of cathode follower 31 is coupled to the D.-C. amplifier 33, one of whose outputs is coupled to the first integrator circuit 18 of the auxiliary radar system through switching circuits 32. Another output from the D.-C. amplifier 33 is fed to a double stability multivibrator circuit 34 so that either polarity of the input signal from the D.-C. amplifier 33 can trigger the multivibrator. When the multivibrator 34 is triggered it causes, through delay networks 35 and 36, switching tubes 37 or 38 to conduct. The firing of the switching tubes 37 or 38 controls the switching circuit 32 to cause the automatic lock-on circuit to disengage from the auxiliary radar system.

The operation of the automatic lock-on circuit is such that initially when the operator of the precision radar system starts to track the desired target the auxiliary radar range gate is set at zero range. The operator has little difficulty in tracking the desired target since the precision radar is assumed to have a very good signal-to-noise ratio when compared to the signal-to-noise ratio of the auxiliary radar system which is at its worst since the tracking will usually commence at the maximum range of the auxiliary radar system. As the precision radar range gate moves out in time, to coincide with the time of occurrence of the selected target echo, shown in Fig. 4, curve D it controls the triggering time of the square wave generator 26 which also moves out in time in coincidence with the precision range gate.

The square wave output of generator 26, which is fed into the balanced modulator 28, is positive after the triggering pulse so that the portion of the wave behind the triggering is of negative polarity. The result is such that the sampling pulse $P_1$ of Fig. 4, curve C when it is in coincidence with the auxiliary radar range gate Fig. 4, curve D would sample a negative voltage and result in a negative voltage output from the modulator circuit 28. The negative voltage causes the output of the isolating cathode follower 31 to swing negatively. When the switch 48 in the automatic lock-on circuit is connected to the tracking position, the negative voltage is coupled to the second integrator in the auxiliary radar system through the switching circuit 32. The negative voltage forces the second integrator plate voltage to rise in turn pushing the time of occurrence of the auxiliary radar range gate away from the zero position. When the auxiliary radar range gate passes through the target range position, the voltage coupled from the cathode follower 31 and thus from the modulator 28 changes polarity and will go from negative to positive because the sampling pulse from the blocking oscillator 30 responsive to the range gate output of the auxiliary radar range gate proceeds in time of occurrence from the negative half of the square wave to the positive half of the square wave amplifier 26. This change in the polarity of the voltage is coupled through the cathode follower 31 to the D.-C. amplifier 33 and the swing in the negative direction is then coupled to the multivibrator circuit 34. When the multivibrator 34 operates, a bias is applied to the switching tubes 37 and 38 through their respective delay networks 35 and 36. The delay of network 35 is made shorter than the delay of network 36 so that switching tube 37 operates first, removing the voltage from the second integrator 19 and at the same time allowing the correction voltage to go to the first integrator 18 by coupling proper switching signals to the switching circuit 32. When the second switching tube 38 fires, the correction voltage coupled to the first integrator is removed. The extra delay in firing switching tube 38 is to allow time for a memory to be established in the range gate unit of the auxiliary radar system.

If the auxiliary radar range gate is further out in range or time than the precision radar range gate, as shown by pulse $P_2$, Fig. 4, curve C the sampling pulse from block-oscillator 30 samples the positive portion of this square wave output of generator 26 giving the positive pulse output from the modulator circuit 28. This positive voltage is then applied to the second integrator 19 in the auxiliary radar system range gate causing its plate voltage to fall and bring the auxiliary range gate towards the zero range. When the auxiliary radar range gate passes in time the precision radar range gate, the error voltage swings from a negative to a positive polarity and this swing is applied to the multivibrator circuit 34, again causing the firing of switching tubes 37 and 38 as previously explained.

Referring to Fig. 3, a schematic circuit diagram of one embodiment of the automatic lock-on circuit of this invention is shown wherein the precision radar range gate pulse is coupled to the grid of vacuum tube 40 to be amplified to a sufficient level to trigger the multivibrator tube circuit 41 after being coupled to its grid through the coupling condenser 42. By means of a potentiometer 43 the square wave generator circuit including vacuum tube 41 is adjusted to have a 50% duty cycle. Since the precision radar range gate, after amplification, triggers the square wave generator circuit 41, the square wave which is generated in effect follows the precision radar range gate in time and is coupled via the cathode follower arrangement of vacuum tube 44 to the balanced modulator circuit. The balanced modulator comprises transformer 45, electron discharge device 46 and condenser 47 and produces either a positive or negative voltage output depending upon the relative phase of the input signal from the auxiliary radar range gate circuit and its position with respect to the square wave generated by vacuum tube 41.

Initially, the switch 48 is in the reset position, and obviously the range gate of the auxiliary radar is at zero range. As the operator places the precision radar range gate in coincidence with the range of the desired target and as the range gate moves out to the coincident position the triggering time of the flip-flop circuit including electron discharge device 41 moves out with it, thus the square wave which is fed into the balanced modulator 46 goes positive after the triggering pulse and the portion of the square wave behind the triggering pulse is negative as shown in curve B, Fig. 4. The range gate from the auxiliary radar system is coupled through the amplifier which includes electron discharge device 49 which inverts the auxiliary radar gate pulse and amplifies it sufficiently to trigger the blocking oscillator tube 50 which when it fires has the same time position as the auxiliary range gate pulse and thus its output pulse is used as the sampling pulse in the balanced modulator 46. As the precision radar range gate moves out to coincident position with a desired target, the sampling pulse coupled from blocking oscillator 50 through transformer 45, which is in coincidence with the auxiliary radar range gate, samples a negative voltage from the square wave generator, thus resulting in a negative voltage output from the modulator circuit. The output of the modulator 46 is coupled into an isolating cathode follower circuit including tube 51. When the output is negative it causes the cathode of electron discharge device 51 and the output coupled from resistor 52 to swing negatively. As the switch 48 is moved to the track position, the negative voltage from resistance 52 is coupled to the second integrator in the auxiliary radar range gate through the closed contacts 53a of relay 53. This negative voltage forces the plate voltage of the second integrator to rise which, in turn, pushes the range gate of the auxiliary radar system away from the zero position until it passes through the target position or in other words the position where the polarity of the output of the square wave generator 41 changes and where the sampling pulse goes from the negative half of the square wave to the positive half of the square wave. This positive change in voltage polarity is coupled through tube 51 to the plate of the D.-C. amplifier tube 54 where the swing is then in the negative direction. Another output is taken from resistance 52a and coupled to a grid of the D.-C. amplifier 54. This negative swing is coupled from the grid of vacuum tube 54 through vacuum tube 55b and condenser 56 to the conducting side of vacuum tube 57. The output of the D.-C. amplifier 54 is taken from potentiometer 58 and fed to the first integrator circuit of the auxiliary radar system through relays 53 and 59. When vacuum tube 57 conducts or fires, plate 57b rises so that a positive voltage is applied to the starting anodes of vacuum tube 60 and 61 through two delay networks. The delay network for vacuum tube 60 comprises condenser 62 and 63 and resistance 64 while the delay network for tube 61 comprises resistances 65 and 66 and condenser 67. The firing of the tubes 60 and 61 operates the relays 53 and 59 which in turn disengage the output of the automatic lock-on circuit of this invention from the range gate of the auxiliary radar system. When vacuum tube 57 fires, switch 53 operates closing contacts 53b and opening contacts 53a removing the voltages from the second integrator circuit of the auxiliary radar system and at the same time allowing the correction voltage to be coupled to the first integrator circuit of the auxiliary radar system through the closed contacts 53b. The correction voltage coupled to the first integrator circuit is obtained from resistance 58 through the normally closed contacts 59a of relay 59. When relay 53 operates, its normally opened contacts 53b, which are in series with the normally closed contacts 59a of relay 59, close completing the circuit to the first integrator circuit. After a given period of time, vacuum tube 60 fires operating relay 59 and removing the correction voltage from the first integrator circuit, the extra delay in the firing of vacuum tube 60 allowing for the establishing of a memory in the range gate unit. When switch 59 operates, the normally opened contacts 59b close and apply a voltage to an indicator lamp 69 indicating that the process of automatic lock-on has been completed.

If switch 48 is moved to the track position, the range gate from the auxiliary radar system is further out in range, i. e., later in time than the range gate from the precision radar system as indicated by its relative position to the time position of the reverse in the polarity of the output of the square wave generator 41, and the sampling pulse coupled from blocking oscillator 50 through transformer 45 samples the positive portion of the square wave giving a positive voltage output from the modulator circuit 46. The positive voltage is applied to the second integrator circuit of the auxiliary radar range system causing its plate voltage to fall and bring its range gate toward the zero range. As the auxiliary range gate passes the precision radar range gate, the error voltage reverses polarity from negative to positive on the plate of vacuum tube 54 and this positive swing is now applied to the grid of the non-conducting side of vacuum tube 57 through condensers 68, 70 and diode 55a. Again, the vacuum tube 57 will conduct and the remainder of the switching cycle remains as heretofore described.

Vacuum tube 57 is included in a double stability circuit when the switch 48 is in the track position. When switch 48 is in the reset position, the grid of 57a is at a ground potential to insure that the 57b portion of tube 57 is always conducting. When switch 48 is in the reset position, grid 57a is at ground potential to insure that tube 57a is cut off. When the switch 48 is in the track position, the grid of tube 57a is connected to a voltage divider through the plate of tube 57b. This raises the potential of the grid of tube 57a so that tube 57 is ready to be triggered as the auxiliary radar range gate passes the polarity reversal of the square wave.

Switch 48 is a four pole double throw switch which in the reset position grounds the grid of tube 57a and prevents the error voltage from being coupled to the first and second integrator circuits of the auxiliary radar system, as well as removing the B+ potential from gas tubes 60 and 61, allowing them to de-ionize. When switch 48 is in the track position, it couples the grid of 57a to a positive voltage source preparing it for firing and couples the error voltage inputs to the first and second integrators as well as coupling the B+ potential to gas tubes 60 and 61, preparing them for firing when the starting anodes receive the proper signal.

While we have described above the principles of our invention in connection with specific apparatus, it is to be clearly understood that this description is made only by way of example and not as a limitation to the scope of our invention as set forth in the objects thereof and in the accompanying claims.

We claim:

1. In combination, a first radar system including a range gate circuit developing a range gate pulse variable in time position to be coincident with the time of reception of an echo pulse received by said first radar system and a second radar system including a range gate circuit developing a range gate pulse, and means to cause the time of occurrence of said second radar system range gate pulse to be responsive to the time of occurrence of said first radar system range gate pulse.

2. An automatic lock-on circuit to cause the range gate circuit of a second radar system to synchronize and lock-on a target tracked by a first radar system comprising means to generate a first signal responsive to the range gate pulse of said first radar system, means to generate a second signal responsive to the range gate pulse of said second radar system, means to generate an error voltage responsive to the difference in time of occurrence of said first and second signals and means to couple said error signal to said second radar system to cause the range gate pulse of said second radar system to be time coincident with the range gate pulse of said first radar system.

3. An automatic lock-on circuit to cause the range gate pulse of a second radar system to be time coincident with the range gate pulse of a first radar system comprising a square wave generator having a 50% duty cycle, means to trigger said square wave generator responsive to the range gate pulse of said first radar system, a blocking oscillator producing a sampling pulse, means to trigger said blocking oscillator responsive to the time of occurrence of the range gate pulse of said second radar system, balanced modulator means to produce an error signal indicative of the time position difference between a first and second input signal, means to couple the output of said square wave generator and said blocking oscillator as said first and second input signals to said balanced modulator to produce said error signal and means to couple said error signal to said second radar system to cause said range gate pulse to move into time coincidence with the range gate pulse of said first radar system.

4. An automatic lock-on circuit to cause the range gate circuit of a second radar system to synchronize and lock-on a target tracked by a first radar system comprising means to generate a first signal responsive to the range gate pulse of said first radar system, means to generate a second signal responsive to the range gate pulse of said second radar system, means to generate an error voltage responsive to the difference in time of occurrence of said first and second signals, means to couple said error signal to said second radar system to cause the range gate pulse of said second radar system to be time coincident with the range gate pulse of said first radar system, means to generate a rate signal responsive to the rate of change of the time of occurrence of said first and second signals and means to couple said rate signal to said second radar system to cause the rate of change of time of occurrence of the range gate pulse of said second radar system to be substantially equal to the rate of change of time occurrence of the range gate pulse of said first radar system.

5. An automatic lock-on circuit to cause the range gate circuit of a second radar system to synchronize and lock-on a target tracked by a first radar system comprising means to generate a first signal responsive to the range gate pulse of said first radar system, means to generate a second signal responsive to the range gate pulse of said second radar system, means to generate an error voltage responsive to the difference in time of occurrence of said first and second signals, means to couple said error signal to said second radar system to cause the range gate pulse of said second radar system to be time coincident with the range gate pulse of said first radar system, means to generate a switching signal responsive to the time coincidence of said first and second radar system range gate pulses, and means responsive to said switching signal to decouple said error signal from said second radar system.

6. An automatic lock-on circuit to cause the range gate circuit of a second radar system to synchronize and lock-on a target tracked by a first radar system comprising means to generate a first signal responsive to the range gate pulse of said first radar system, means to generate a second signal responsive to the range gate pulse of said second radar system, means to generate an error voltage responsive to the difference in time of occurrence of said first and second signals, means to couple said error signal to said second radar system to cause the range gate pulse of said second radar system to be time coincident with the range gate pulse of said first radar system, means to generate a switching signal responsive to the time coincidence of said first and second radar system range gate pulses, and means responsive to said switching signal to decouple said error signal from said second radar system, and to couple said rate signal to second radar system, time delay means, means to couple said switching signal to said delay means and means responsive to said switching signal to decouple said rate signal from said second radar system.

7. An automatic lock-on circuit to cause the range gate pulse of a second radar system to be time coincident with the range gate pulse of a first radar system comprising a square wave generator having a 50% duty cycle, means to trigger said square wave generator responsive to the range gate pulse of said first radar system, a blocking oscillator producing a sampling pulse, means to trigger said blocking oscillator responsive to the time of occurrence of the range gate pulse of said second radar system, means to compare the time of occurrence of said sampling pulse relative to said square wave, means responsive to said comparison to produce an error signal, means to couple said error signal to said second radar system to cause said range gate pulse to move into time coincidence with the range gate pulse of said first radar system.

No references cited.